US006367003B1

(12) United States Patent
Davis

(10) Patent No.: US 6,367,003 B1
(45) Date of Patent: Apr. 2, 2002

(54) DIGITAL SIGNAL PROCESSOR HAVING ENHANCED UTILIZATION OF MULTIPLY ACCUMULATE (MAC) STAGE AND METHOD

(75) Inventor: Henry A. Davis, Soquel, CA (US)

(73) Assignee: Micron Technology, Inc., Boise, ID (US)

(*) Notice: Subject to any disclaimer, the term of this patent is extended or adjusted under 35 U.S.C. 154(b) by 0 days.

(21) Appl. No.: 09/638,460

(22) Filed: Aug. 14, 2000

Related U.S. Application Data

(63) Continuation of application No. 09/034,801, filed on Mar. 4, 1998, now abandoned.

(51) Int. Cl.[7] .................................................. G06F 9/30
(52) U.S. Cl. ....................... 712/208; 712/209; 712/210; 712/211; 712/216; 712/220; 712/221
(58) Field of Search ................................. 712/208, 209, 712/210, 211, 216, 220, 221

(56) References Cited

U.S. PATENT DOCUMENTS

| 4,891,754 A | 1/1990 | Boreland |
| 4,975,947 A | 12/1990 | Chauvel |
| 5,125,094 A | 6/1992 | Kyuma |
| 5,175,863 A | 12/1992 | Jones, Jr. |
| 5,491,828 A | 2/1996 | Intrater et al. |
| 5,504,670 A | 4/1996 | Barth et al. |
| 5,594,679 A | 1/1997 | Iwata |
| 5,698,803 A | 12/1997 | Rossum |
| 5,732,251 A | 3/1998 | Bartkowiak |
| 5,822,613 A | 10/1998 | Takaki et al. |
| 5,909,463 A | 6/1999 | Johnson et al. |
| 6,175,911 B1 * | 1/2001 | Oberman et al. ........... 712/221 |

OTHER PUBLICATIONS

John A. Kowaleski, A Dual–Excution Pipelined Floating Point CMOS Processor.*
Henry Davis, et al., "Merging Data Converters and DSPs for Mixed–Signal Processors", IEEE Micro, Oct. 1990; pp. 17–27.

* cited by examiner

Primary Examiner—Mark Zimmerman
Assistant Examiner—Mackly Monestime
(74) Attorney, Agent, or Firm—Gazdzinski & Associates

(57) ABSTRACT

A digital signal processor (DSP) architecture which allows the DSP Multiply-Accumulator (MAC) to be used for special fixed functions during those times when the programmable portions of the DSP are not using the MAC circuitry. During the idle times, the DSP processor gives control of the MAC to the fixed function circuit. The fixed functions provided by the fixed function circuit can include digital filters, including a Finite Impulse Response filters (FIR), an Infinite Impulse Response (IIR) filter, or an oversampling filter associated with a sigma-delta converter. The DSP may, under program control, set up specific parameters for the fixed function, provide parameters to the fixed function parameter memory, or obtain results from the fixed function. Parameters for the fixed function circuit include the type of filter, the number of taps and the filter coefficients. For a decimation filter, the fixed function parameters can also include the decimation factor.

32 Claims, 13 Drawing Sheets

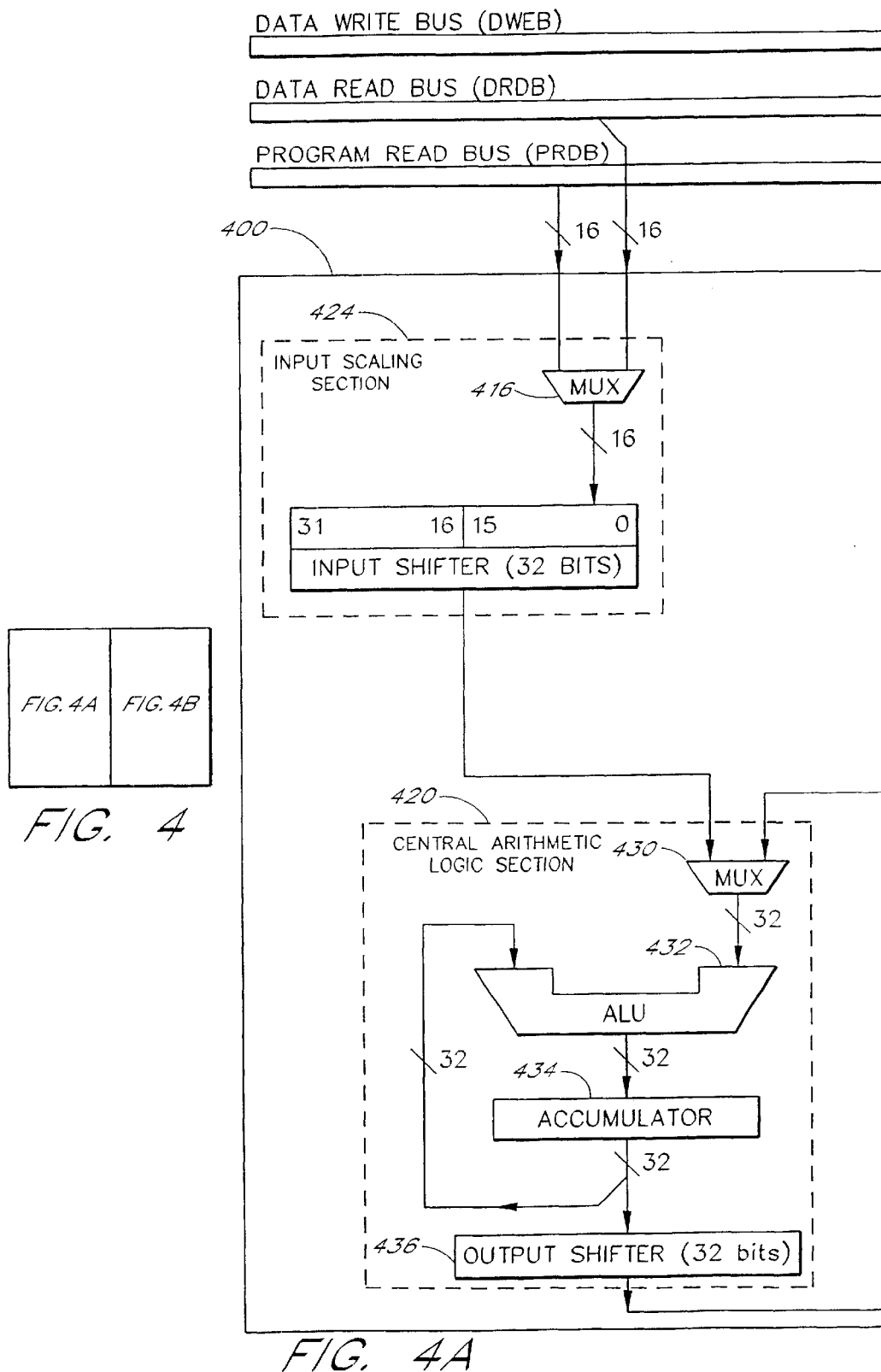

DIGITAL SIGNAL PROCESSOR HAVING ENHANCED UTILIZATION OF MULTIPLY ACCUMULATE (MAC) STAGE AND METHOD

This application is a continuation of U.S. patent application Ser. No. 09/034,801 filed Mar. 4, 1998 now abandoned entitled "Digital Signal Processor Having Enhanced Utilization Of Multiply Accumulate (MAC) Stage And Method".

BACKGROUND OF THE INVENTION

1. Field of the Invention

The present invention relates to architectures for digital signal processors. More particularly, the present invention relates to digital signal processors having both fixed and programmable functions.

2. Description of the Related Art

Digital signal processing involves the digital representation of signals and the use of digital processors (computers) to analyze, modify, or extract information from such signals. A Digital Signal Processor (DSP) is a computer processor in which the internal data paths and functional units of the processor have been optimized for executing the types of algorithms typically encountered in signal processing. A DSP is typically characterized by a multiple bus structure with separate memory spaces for data and program instructions and arithmetic units designed to perform multiply-accumulate operations very rapidly. As discussed in more detail below, the multiply-accumulate operation, or sum-of-products, involves the multiplication of two numbers to produce a result which is then added to a running sum of previous results. DSPs typically have a fast multiply-accumulator (MAC) functional unit which can perform the multiply and add (accumulate) operation in a single clock cycle.

Most DSP algorithms such as filtering, correlation and the Fast Fourier Transform (FFT) involve repetitive use of the MAC. The repetitive nature of these operations typically means that the operation of the processor falls into predictable patterns. This predictability of the algorithms allows the use of increased hardware parallelism in order to achieve high processing speeds. Predictability also allows a DSP designer to increase processor speed through the use of: a Harvard architecture; pipelining; special instructions dedicated to signal processing; replication of functional units; and an on-chip cache. In addition to the above features, many recent DSP designs have employed the use of Very Long Instruction Word (VLIW) architectures in an effort to provide additional hardware parallelism.

The use of a pipelined architecture allows the hardware in a DSP to provide the MAC with a continuous uninterrupted stream of data, and thus, in theory, the MAC can be kept busy all of the time. Nevertheless, for many signal processing applications, the MAC is not used during every processor cycle. In many cases, a signal processing. program running on the DSP program uses the MAC circuitry only occasionally, thus leaving the MAC idle and available for other uses much of the time. As described below, this inability to use the MAC continuously stems from the fact that, in addition to the multiply-accumulate operations, all signal processing programs must perform a variety of housekeeping functions such as input/output, branching, initializing variables, updating loop counter etc. Typically, these housekeeping functions do not require use of the MAC, thus leaving the MAC idle.

SUMMARY OF THE INVENTION

One aspect of the present invention is a DSP architecture in which a Multiply-Accumulator (MAC) is used for special fixed functions during times periods ("idle times")when the programmable portions of the DSP are not using the MAC circuitry. During the idle times, the DSP processor gives control of the MAC to the fixed function circuit. The fixed functions provided by the fixed function circuit can include digital filters, including Finite Impulse Response (FIR) filters and Infinite Impulse Response (IIR) filters. The fixed functions may also include an oversampling filter associated with a sigma-delta converter, or any other function that manipulates digital data. The DSP may, under program control, load configuration registers for the fixed function, provide coefficients for a fixed function coefficient memory, or obtain results from the fixed function. Configuration data for the fixed function circuit may include the type of filter and the number of taps. For a decimation filter, the fixed function parameters can also include the decimation factor. Digital data sample values for the fixed function circuit may be stored in a sample memory, and filter coefficients (also know as filter weights) may be stored in a coefficient memory. A sigma-delta modulator may also be used to provide digital sample inputs to the fixed function circuit. In yet another embodiment, a sigma-delta modulator provides samples to a dedicated fast decimation filter. Output samples from the fast decimation filter are then provided to the fixed function circuit.

In another embodiment, the fixed function circuit may also operate in a "cycle steal" mode. In yet another embodiment, use of the MAC is allocated on a priority scheduling basis.

BRIEF DESCRIPTION OF THE DRAWINGS

FIG. 4, comprising FIGS. 4A and 4B, is a block diagram of a DSP having a fixed function control circuit which shares the multiplier-accumulator of the DSP.

DETAILED DESCRIPTION OF THE PREFERRED EMBODIMENTS

Figure 1:
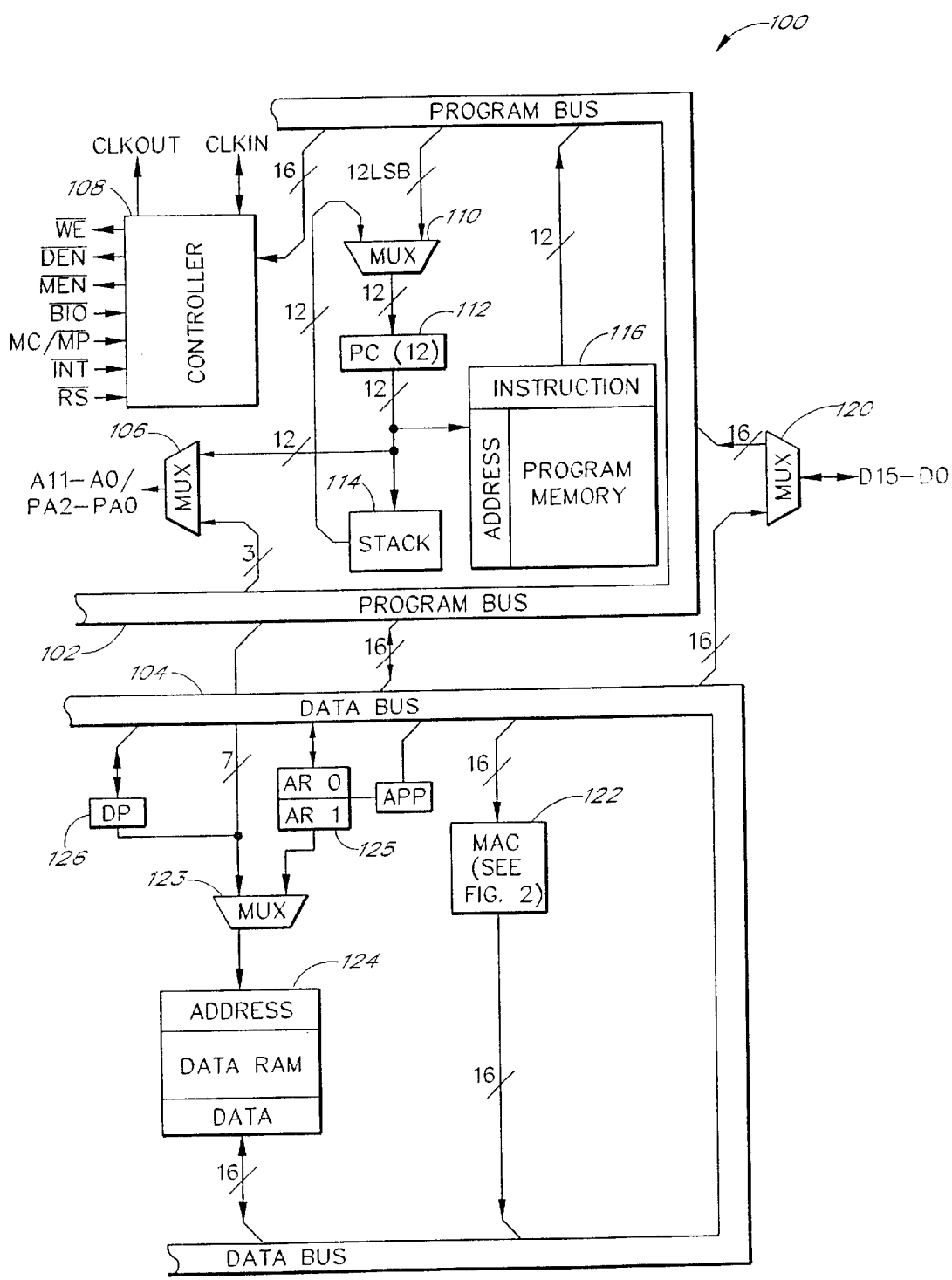
FIG. 1 is a block diagram of a typical DSP.
Figure 2:
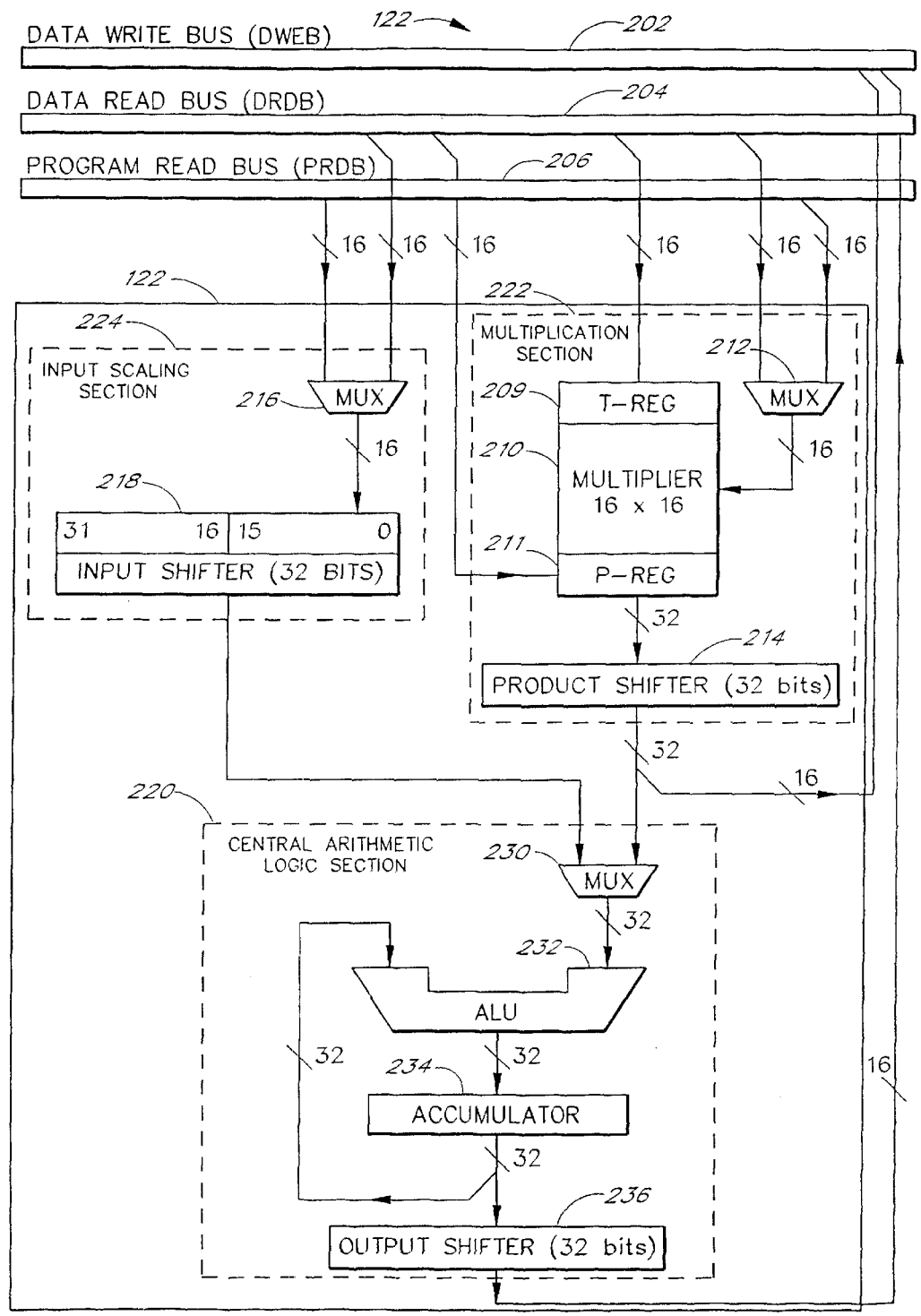
FIG. 2 is a block diagram of the multiply-accumulator (MAC) portion of a typical DSP.
Figure 3:
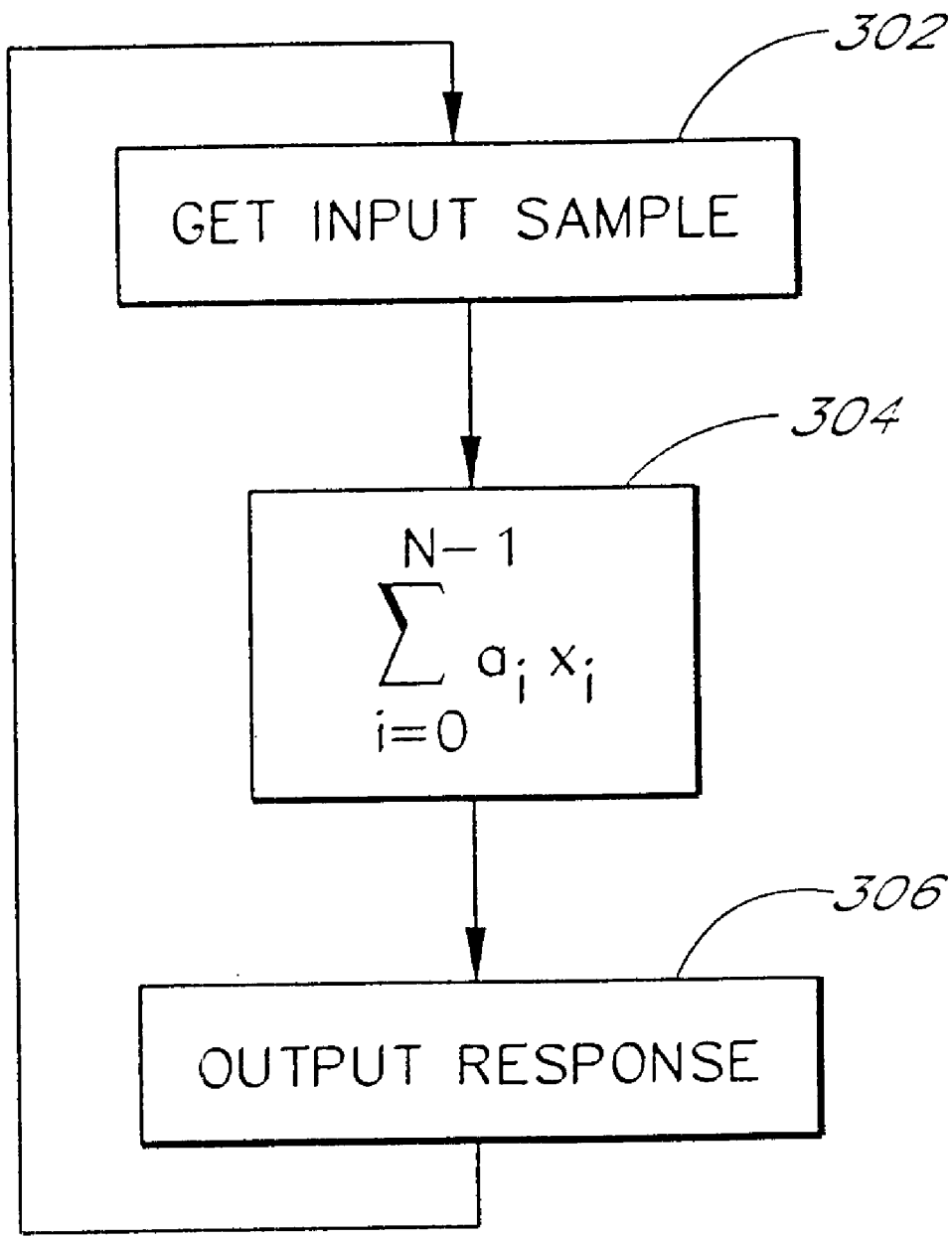
FIG. 3 is a flowchart which illustrates the process steps of a finite impulse response filter.
Figure 4B:
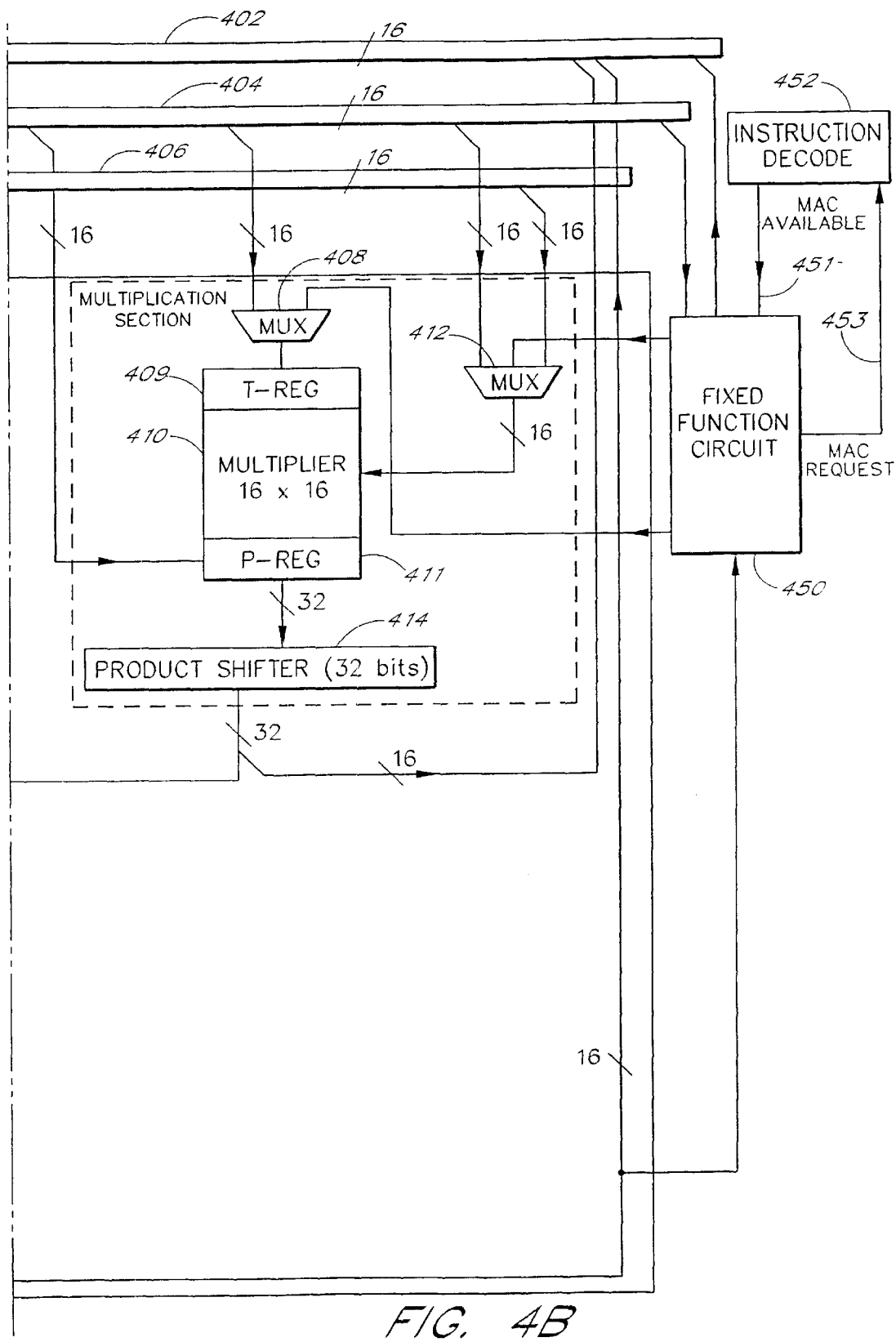
Figure 5:
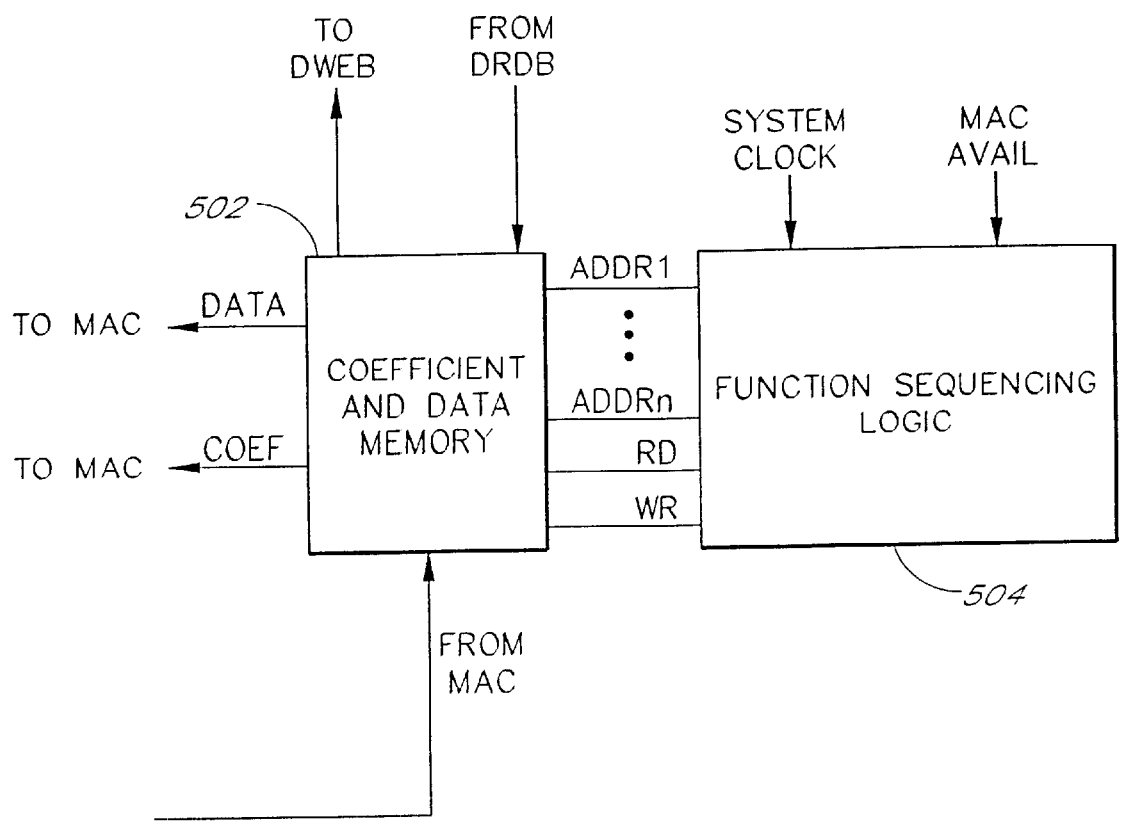
FIG. 5 is a block diagram which illustrates the primary functional aspects of the fixed function control circuit.

One aspect of the present invention is a digital signal processor (DSP) architecture which allows the DSP's Multiply-Accumulator (MAC) to be used for special fixed functions during those times when the programmable portions of the DSP are not using the MAC. The fixed functions are implemented by a fixed function circuit that is connected to the MAC. In the description below, FIGS. 1 and 2 are first used to describe one embodiment of a conventional DSP used to implement a filter algorithm shown in FIG. 3. FIGS. 4 and 5 show a fixed function control circuit added to the DSP shown in FIGS. 1 and 2 and which can perform the same functions as shown in the algorithm of FIG. 3. Subsequent figures describe various other embodiments of a DSP to which a fixed function circuit has been added. The fixed functions provided by the fixed function circuit can include digital filters, including Finite Impulse Response (FIR) filters, Infinite Impulse Response (IIR) filters, an oversampling filter associated with a sigma-delta converter, etc. In a preferred embodiment, the fixed function circuit provides digital signal processing "for free" because the fixed function circuit uses the MAC when the MAC would otherwise be idle.

FIG. 1 is a block diagram of a typical digital signal processor (DSP). The processor of FIG. 1 is based on a Harvard architecture and is thus characterized by a separate program memory 116 and data memory 124. The program memory 116 receives addresses from a program counter 112 and provides program data to a program bus 102. The program counter 112 receives data inputs from an output of a multiplexer 110. A first input of the multiplexer 110 receives data from the program bus 102 and a second input of the multiplexer 110 receives data from an output of a stack 114. An input of the stack 114 receives data from the program counter 112. The program bus 102 exchanges data over a bi-directional data path with a data bus 104. The program bus also provides address data to a first input of a multiplexer 123. A set of address registers 125 provides address data to a second input of the multiplexer 123. An output of the multiplexer 123 provides address data to an address input of the data memory 124. The address registers 125 have a bi-directional data path to the data bus 104. A data output of the data memory 124 provides bi-directional exchange of data (read and write operations) with the data bus 104. An input to a multiply-accumulator (MAC) 122 receives data from the data bus 104 and an output of the MAC 122 provides data to the data bus 104.

In the processor 100, program instructions are stored in the program memory 116 and data values are stored in the data memory 124. When the processor 100 is running a program, the program instructions are fetched from the program memory 116 according to the program counter 112 and placed on the program bus 102. Instructions on the program bus 102 are used to control the operation of the MAC 122. Data for the MAC 122 is obtained primarily from a data memory 124. Addresses for the data memory 124 are obtained from either the program bus or from the address registers 125.

FIG. 2 is a block diagram of a prior art MAC 122 for the DSP shown in FIG. 1. FIG. 2 shows an input scaling section 224, a multiplication section 222, and a central arithmetic logic section 220. The multiplication section 222 includes a multiplier 210. A first input of the multiplier 210 is provided by a T (temporary) register 209. An input to the T register 209 is provided by a data read data bus (DRDB) 204. A second input of the multiplier 210 is provided by a multiplexer 212. A first input of the multiplexer 212 is provided by the DRDB 204. A second input of the multiplexer is provided by a program read data bus (PRDB) 206. The multiplier 210 has a single output which is provided to a P (product) register 209. The output of the P register 211 is fed to a product shifter 214. An output of the product shifter 214 is provide to a data write bus (DWEB) 202.

The input scaling unit 224 includes an input multiplexer 216. A first input of the input multiplexer 216 is provided by the PRDB 206 and a second input of the input multiplexer 216 is provided by the DRDB 204. The input multiplexer 216 has a single output which is provided as an input to an input shifter 218.

The central arithmetic logic section 220 includes an arithmetic logic unit (ALU) 232, a multiplexer 230, an accumulator 234 and an output shifter 236. A first input of the multiplexer 230 is provided by the input shifter 218. A second input to the multiplexer 230 is provided by the product shifter 214. The multiplexer 230 has a single output which is provided to a first input of the ALU 232. An output of the ALU 232 is provided to an input of the accumulator 234. A second input of the ALU 232 is provided by an output of the accumulator 234. The output of the accumulator 234 is also provided to the output shifter 236. An output of the output shifter 236 is provided to the data write bus (DWEB) 202.

Although the processor 100 shown in FIGS. 1 and 2 is a general purpose DSP, capable of performing many digital signal processing algorithms, the overall function of the processor 100 is most easily understood by a detailed examination of the operation of the processor when running a program for a simple third-order finite impulse response (FIR) filter. The FIR filter is important because it demonstrates the multiply-accumulate sequence which is found in almost all digital signal processing algorithms. It will be understood that the present invention is not limited to FIR filters and that the FIR filter is merely used as a convenient example. One skilled in the art will recognize that the invention disclosed herein is applicable to virtually all digital signal processing algorithms.

The N-point FIR filter is expressed mathematically by the simple expression shown in Equation 1.

$$y_n = \sum_{k=0}^{N-1} a_k x_{n-k} \quad (1)$$

The values $x_{n-k}$ are the filter input samples, the values $a_k$ are the filter weights, and the values $y_n$ are the filter outputs. The actual values of $a_k$ are constant and are typically determined by the desired filter transfer function. When programming a DSP, the values $a_k$ are typically pre-computed and stored in memory. The values $x_i$ (e.g. $x_0$, $x_1$, $x_2$, $x_3$ . . . ) represent successive digitized samples of an input waveform. The value $x_n$ represents the most recent sample, the value $x_{n-1}$ represents the previous sample, etc. In a typical application, the values $x_i$ may be successive samples from an analog-to-digital converter (ADC). Likewise, the values $y_i$ represent successive samples of the FIR filter output waveform where $y_n$ is the present output sample, $y_{n-1}$ is the previous output sample, etc. In a typical application, the output sample $y_n$ may be sent to a digital-to-analog converter (DAC).

FIG. 3 is a flowchart which illustrates the steps generally necessary to implement an FIR filter according to Equation 1. FIG. 3 shows the FIR filter process as starting with a process block 302 where an input sample $x_n$ is obtained. The process then advances to a process block 304 where the expression in Equation 1 is used to compute $y_n$. The process then advances to a process block 306 where the value of $y_n$ is provided as an output. The process then loops back to the process block 302 to obtain the next input sample.

For a three tap FIR filter (N=3), Equation 1 shows that $y_n$ is a function of $x_n$, $x_{n-1}$ and $x_{n-2}$. In other words, the filter output is a function of the three most recent input samples. As a result, the FIR filter function in the DSP typically uses a vector X to store the three most recent samples. The current sample $x_n$ is stored in X[0], the previous sample $x_{n-1}$ is stored in X[1], and the sample $x_{n-2}$ is stored in X[2]. The vector X is treated like a shift register. Conceptually, as each new input sample is obtained, each entry in the vector is shifted forward one index, and the new sample value is stored in X[0]. In practice, it is usually more efficient to perform the shifting operation in reverse as demonstrated by the following pseudo-code fragment.

1 begin fir_filter
2 input a new sample and store in X[0]
3 accumulator:=0
4 accumulator:=accumulator+$a_2$*X[2]
5 X[2]:=X[1]
6 accumulator:=accumulator+$a_1$*X[1]
7 X[1]:=X[0]
8 accumulator:=accumulator+$a_0$*X[0]
9 $y_n$:=accumulator
10 end fir_filter As the above code fragment shows, once the value of X[2] has been used to compute $a_2$*X[2] (line 4) then it is no longer needed and can be overwritten by X[1] (line 5). Similarly, once the value of X[1] has been used to compute $a_1$*X[1] (line 6) it is no longer needed and can be overwritten by X[0] (line 7). Virtually all DSP architectures contain special instructions and data paths to allow the above algorithm to run very efficiently. To a very large extent, the ability to execute the above algorithm at high speed is the hallmark of a DSP.

For example, Table 1 shows the assembly code to implement the above algorithm on a TMS32010 DSP manufactured by Texas Instruments Corp. In line 1 of Table 1 a new value of $x_n$ is read from an input port 2 (PA2). In line 2, the accumulator 234 (shown in FIG. 2) is cleared. The LT instruction in line 3 loads the value of $x_n$ into the T register 209. The MPY instruction in line 4 computes $a_2$*X[2] and stores the value in the P register 211. The LTD instruction in line 5 performs two simultaneous functions. First, the LTD instruction adds the contents of the P register 211 to the contents of the accumulator 234. Second, the LTD instruction loads X[1] into the T register 209 and the value in X[1] is copied to the next higher data memory address (which is X[2]). Thus, the instruction pair MPY, LTD seen in lines 4 and 5 of Table 1 form the heart of the FIR algorithm. The MPY, LTD instruction pair is repeated in lines 6 and 7 to compute $a_1$*X[1] and load X[0] into the T register 209. The MPY instruction in line 8 computes $a_0$*X[0] and the result is added to the accumulator 234 by the APAC instruction in line 9. Upon completion of line 9, the accumulator contains the output $y_n$ of the FIR filter. The value $y_n$ is stored in memory by the SACH instruction in line 10, and the value $y_n$ is sent to an output port 2 by the OUT instruction in line 11. The B instruction in line 12 is a branch back to line 1.

1. loop IN, XN, PA2; x[0]=an input from port 2
2. ZAC; <a>=(zero the accumulator)
3. LT XNM2; <t>=X[2]
4. MPY H2; <p>=X[2]*a(2)
5. LTD XNM1; <a>+=<p>; X[2]=X[1]
6. MPY H1; X[1]*h(1)
7. LTD XN; <a>+=<p>; X[1]=X[0]
8. MPY H0; <p>=X[0]*h(0)
9. APAC; <a>+=<p>
10. SACH YN, 1; store the result
11. OUT YN, PA2; output the result to port 2
12. B loop; loop back and get next sample Table 1: Typical code for a third-order FIR filter on the TMS32010.

The implementation in Table 1 uses straight-line (non-looping) code which is fast but not particularly compact. For longer length FIR filters, straight-line code may require a larger program memory size. Memory size can be reduced by using looped code as shown in Table 2 where a loop is coded in lines 6 and 7. However, for many DSP architectures, straight-line code runs much faster than looped code because the overhead associated with computing loop counters and performing branch operations is avoided. Some DSP architectures include special purpose hardware loop counters to reduce the recurring overhead.

Even though the code shown in Table 1 is compact, and avoids the overhead associated with looped code, it does not use the MAC 122 100% of the time. The MAC 122 is not used in lines 1, 10, and 11, and 12. Thus, even in the efficient implementation of Table 1, the MAC 122 is idle roughly 30% of the time. This percentage would drop if more taps were used in the FIR filter (resulting in more MPY, LTD instruction pairs inside the loop) but the MAC 122 still will not be used 100% of the time. The same holds true for the looped code shown in Table 2. In Table 2, the MAC 122 is not used during the execution of lines 1, 2, 3, 10 and 11. Use of the MAC 122 is summarized in Table 3.

1. nxt IN XN, PA0; input a new sample
2. LRLK AR1, >3FF; point to end of block B1
3. LARP AR1
4. MPYK 0; set P register to zero
5. ZAC; clear the accumulator
6. RPTK NM1; repeat n−1 times
7. MACD>FF00*-; multiply and accumulate
8. APAC; add last MPY to accumulator
9. SACH YN, 1; store result in YN
10. OUT YN, PA1; output the response
11. B nxt; loop to get next input sample Table 2. Typical DSP code for a fourth-order FIR filter on the TMS32020.

| Operation | MAC used: |
|---|---|
| Obtain Sample | no |
| form $a_i$ address | no |
| form $x_i$ address | no |
| calculate $a_i x_i$ | yes |
| accumlate | yes |
| store accumlator | no |
| output response | no |

Table 3: Use of the MAC in a digital filter program.

The time periods when the MAC 122 is idle represent wasted computing resources. These wasted resources can be recovered by adding a fixed function control circuit to the DSP which uses the MAC 122 when the MAC 122 is not otherwise needed. The fixed function control circuit can use the MAC 122 to implement a specific function, such as a digital filter, sigma-delta converter, etc.

FIG. 4 is a block diagram of a MAC 400 connected to an integrated fixed function control circuit 450. The MAC 400 replaces the MAC 122 in the circuit of FIGS. 1 and 2. FIG. 4 shows an input scaling section 424, a multiplication section 422, and a central arithmetic logic section 420. The multiplication section 422 includes a multiplier 410. A first input of the multiplier 410 is provided by T register 409. An input to the T register 409 is provided by an output of a multiplexer 408. A first input of the multiplexer 408 is provided by a data read bus (DRDB) 404. A second input of the multiplexer 408 is provided by the circuit 450. A second input of the multiplier 410 is provided by a multiplexer 412. A first input of the multiplexer 412 is provided by the DRDB 404. A second input of the multiplexer 412 is provided by a program read bus (PRDB) 406. A third input of the multiplexer 412 is provided by the fixed function circuit 450. The multiplier 410 has a single output which is provided to a P (product) register 411. The output of the P register 411 is fed to a product shifter 414. An output of the product shifter 414 is provide to a data write buss (DWEB) 402.

The input scaling unit 424 includes an input multiplexer 416. A first input of the input multiplexer 416 is provided by the PRDB 406. A second input of the input multiplexer 416 is provided by the DRDB 404. The input multiplexer 416 has a single output which is provided as an input to an input shifter 418.

The central arithmetic logic section 420 includes an arithmetic logic unit (ALU) 432, a multiplexer 430, an accumulator 434 and an output shifter 436. A first input of the multiplexer 430 is provided by the input shifter 418. A second input to the multiplexer 430 is provided by the product shifter 414. The multiplexer 430 has a single output which is provided to a first input of the ALU 432. An output of the ALU 432 is provided to an input of the accumulator 434. A second input of the ALU 432 is provided by an output of the accumulator 434. The output of the accumulator 434 is also provided to the output shifter 436. An output of the output shifter 436 is provided to the data write buss (DWEB) 402.

The output of the output shifter 436 is also provided to an input of the circuit 450. An input of the circuit 450 is provided by the DRDB 304. An output of the circuit 450 is provided to the DWEB 402. An instruction decode unit 452 receives a MAC request signal 453 from the fixed function circuit 450 and provides a MAC available signal 451 to the fixed function circuit 450.

The MAC 400 operates in a manner substantially similar to the MAC 122 except that in the MAC 400, the multiplexers 408 and 412 allow the fixed function circuit 450 to provide data to the data inputs of the MAC 400. Thus, the MAC 400 can be used by both the DSP 100 and the fixed function circuit 450. The instruction decode unit 450 receives instructions from the PRDB 406, either directly or through a fetch register (not shown). When the instruction decode unit 452 determines that an instruction will not be using the MAC 400, then the instruction decode unit 452 generates a MAC available signal 451 which is sent to the fixed function circuit. Assertion of the MAC 451 available signal allows the fixed function circuit to take control of the MAC 400. In a preferred embodiment, the fixed function circuit 450 gains access to the MAC 400, by sending a MAC request to the instruction decode unit 452. When the instruction decode unit 452 receives a MAC request, and the MAC available line is asserted, then the instruction decode unit 452 directs the multiplexers 408 and 412 to accept data from the fixed function circuit 451.

FIG. 5 is a functional block diagram of the fixed function control circuit 450. In FIG. 5, the circuit 450 is represented by a memory block 502 and a sequencing logic block 504. The memory block 502 provides data and coefficient outputs to the multiplexers 408 and 412. The memory block 502 further provides data output to the DWEB 402 and receives data from the DRDB 404. The sequencing logic block 504 receives a system clock input and a MAC available input from the DSP and provides address and control outputs to the memory block 502.

Figure 6:
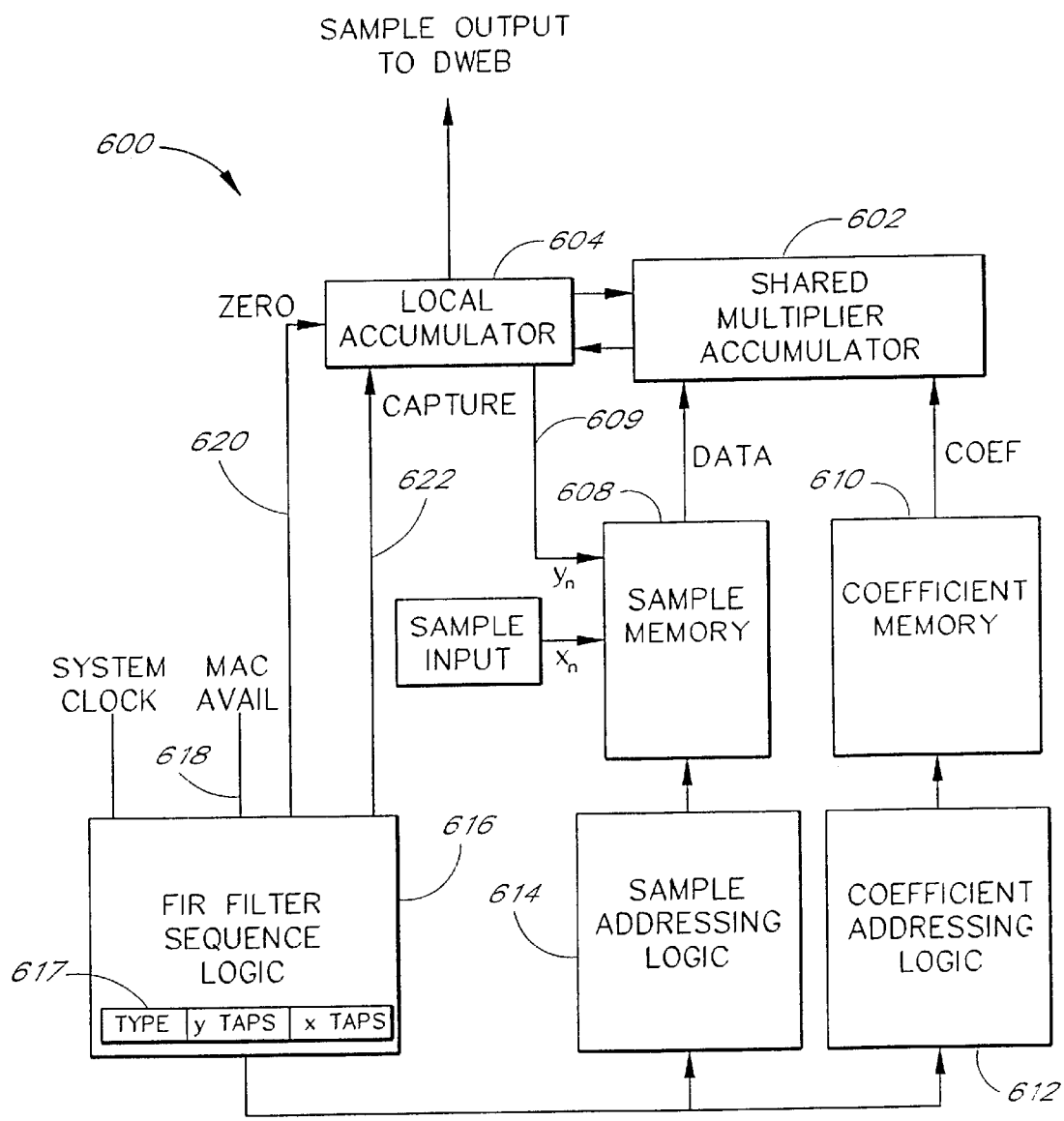
FIG. 6 is a block diagram of a fixed function control circuit which implements a digital filter.

FIG. 6 is a block diagram of an integrated fixed function circuit 600 which implements a finite impulse response filter. The circuit 600 is assumed to be connected to a DSP having a MAC 602 which is shared by the DSP and the circuit 600. For example, the circuit 600 is one possible implementation of the fixed function circuit 450 shown in FIG. 4. The circuit 600 has a sequence logic block 616 which receives a system clock signal and a MAC available signal from the DSP. The sequence logic block 616 provides control outputs to a sample address logic block 614 and a coefficient address logic block 612. The sample address logic block 614 provides an address output to a sample memory 608. The sample memory 608 provides a data output to the shared MAC 602 and receives data inputs from a sample input block. The sample input block can be any circuit which provides a stream of data samples. For example, the sample input block can be coupled to the DRDB 404 so that the input samples to the fixed function circuit are loaded under program control. In an alternative embodiment, the sample input block can be coupled to an external input bus. In yet another embodiment, the sample input block 606 can be an analog-to-digital converter. The sample memory 608 may also receive data from a local accumulator 604 via a data path 409.

The coefficient address logic block 612 provides an address output to a coefficient memory 610. The coefficient memory 610 provides a data output to the shared MAC 602. The coefficient memory 610 provides filter coefficients (or weights) such as the values $a_k$ in Equation 1. One skilled in the art will recognize that the coefficient memory can be loaded using conventional techniques for storing data in a memory. For example, in one embodiment, the coefficient memory 610 can be coupled to the DRDB 404 so that the coefficient memory 610 is loaded by the DSP program. In an alternative embodiment, the coefficient memory 610 is a read only memory.

The circuit 600 also provides a local accumulator 604. The sequence logic 618 provides a zero line 620 to clear the contents of the local accumulator 604 and a capture line 622 to load the local accumulator 604. When the capture line 622 is asserted, the local accumulator 604 captures the accumulator value in the shared MAC 602.

The filter sequence logic block 616 contains the necessary control logic needed to implement the desired fixed function. The sequence logic block 616 controls the sample addressing logic block 614 and the coefficient addressing logic block 612. In response to addresses generated by the sample addressing logic block 614, the sample memory 608 provides sample data to the shared MAC 602. In response to addresses generated by the coefficient addressing logic block 612, the coefficient memory 610 provides filter coefficients to the shared MAC 602. The optional data path 609 provides data from the local accumulator 604 back to the sample memory 608

The fixed function circuit 600 stores data samples in the sample memory 608 and filter coefficients in the coefficient memory 610. Operation of the fixed function circuit 600 is controlled by the sequence logic block 616. In operation of the circuit 600, digital filter coefficient (weights) are loaded into the coefficient memory 610. Samples $x_n$ are loaded from the sample input into the sample memory 608. When the sequence logic block 616 obtains access to the shared MAC 602, the sequence logic block 616 directs the sample addressing logic 614 to generate an address into the sample memory 608 and directs the coefficient addressing logic 612 to generate an address into the coefficient memory 610. Once addressed, the memories 608 and 610 supply samples and coefficients to the shared MAC 602 which calculates a result as needed for the digital filter. Partial results may be stored in the local accumulator 604. At the start of the calculation for each filter output, the sequence logic 616 asserts the zero line 620 to clear the local accumulator 604. The sequence logic 616 asserts the capture line 622 to capture results from the shared MAC 602 when, for example, use of the shared MAC 602 by the fixed function circuit 600 is about to be lost. Thus, the fixed function circuit 600 need not have continuous access to the MAC 602 in order to compute a filter output sample $y_n$. By storing temporary results in the local accumulator 604, the calculation of one filter output sample $y_n$ may be spread over several different accesses to the shared MAC 602.

Preferably, the instruction decode unit 452 will assert the MAC available signal 451 when the MAC is not used by a DSP instruction. A programmer writing code for a DSP having a fixed function circuit can ensure that the MAC available signal 451 will be asserted by inserting "no operation" (NOP) instructions into a program. Alternatively, the DSP may operate in a priority based allocation mode where the instruction decode unit 452 allocates use of the MAC based on a priority basis. In yet another embodiment, the fixed function circuit 450 may send a "high priority" request to the instruction decode unit 452 asking the instruction decode unit to assert the MAC available signal 451. Note that when responding to a high priority request, or when allocating use of the MAC to the fixed function circuit 450 on a priority basis, it may be necessary for the instruction decode unit 452 to stall or delay the normal instruction processing of the DSP.

One skilled in the art will recognize that many classes of digital filters can be generated from a sequence of input samples and a sequence of coefficients. Thus the structure of the fixed function circuit 600 comprising a sample memory 616, and a coefficient memory 610 that are controlled by a filter sequence logic block 618 can be used to implement many different types of filters. Examples of digital signal processing functions that can be generated by this structure include, but are not limited to, finite impulse response (FIR) filters, infinite impulse response (IIR) filters, decimation filters, etc. The differences between the aforementioned functions lie in the way in which the coefficients are applied to the input samples and the values of the coefficients themselves. In a particularly preferred embodiment, the filter sequence logic block 616 includes a control register 617 having a collection of bits which specify the type of filter to be implemented. The control register may also have a collection of bits which specify the number of taps in the filter.

In an FIR filter, according to Equation 1, the filter output samples are only a function of the filter input samples and the filter coefficients. Thus, for an FIR filter, the data path 609 is not needed. An FIR filter is completely specified by the number of taps, and the filter coefficient for each tap. For an IIR filter, the filter output is a function of both the input samples and the previous output samples. Thus, for an IIR filter, the data path 609 is useful for providing output samples back into the sample memory. Further, for an IIR filter, the filter is specified by the number of input samples, the input sample coefficients, the number of output samples, and the output sample coefficients. Thus, for the IIR filter, the control register may be broken up into a first sub-field and a second sub-field. The first sub-field specifies the number of input sample taps, and the second sub-field specifies the number of output sample taps, as shown in FIG. 6.

The Sigma Delta Embodiment

Figure 7A:
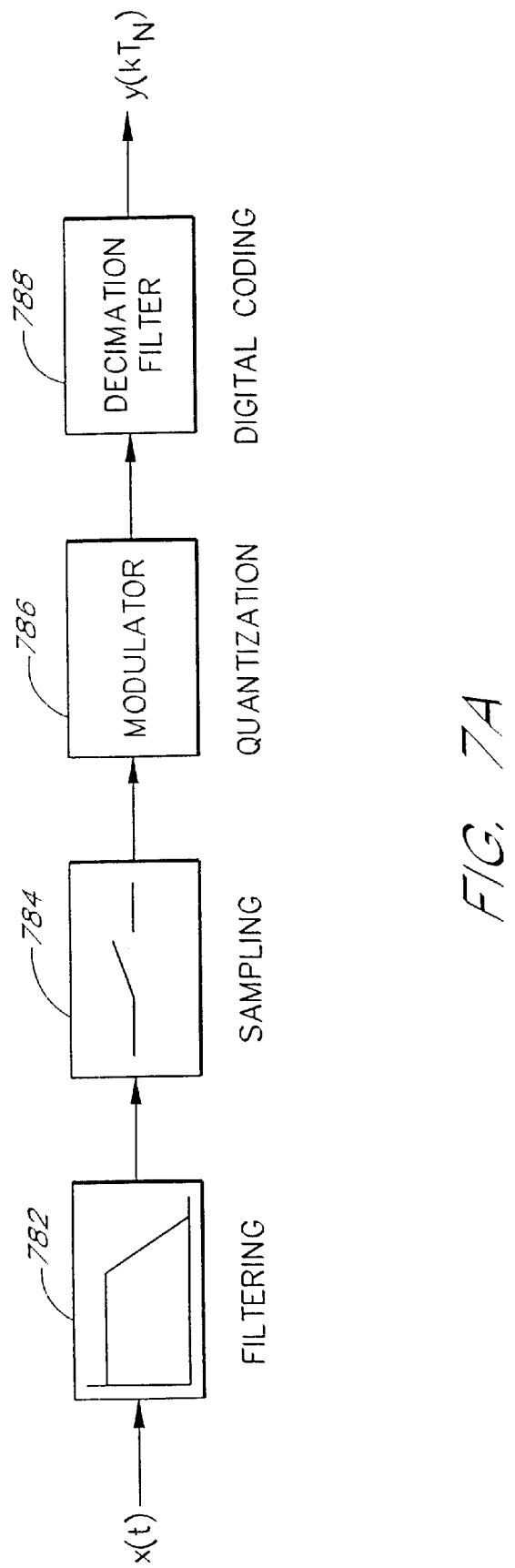
FIG. 7A is a block diagram of an oversampled analog-to-digital converter.

In an alternative embodiment, the fixed function circuit can be configured as an oversampled analog-to-digital converter (ADC). FIG. 7A is a block diagram of an oversampled ADC comprising the series combination of an analog anti-aliasing filter 782, a sampler 784, a modulator 786, and a decimation filter 788. The decimation filter 788 is preferably a digital filter which can be implemented using an integrated fixed function circuit.

An input of the anti-aliasing filter 782 receives an analog signal to be digitized. The anti-aliasing filter 782 limits the bandwidth of the input analog signal to one half of the sampling rate of the sampling block 784 and thereby prevents distortion of the input signal due to aliasing. An output of the filter 782 is provided to the sampling block 784 which samples the analog signal at a sample frequency $f_s$. The output of the sampling block 784 is provided to a modulator 786 which produces a output comprising a stream of single bit samples. The modulator 786 is preferably a sigma-delta modulator. The output of the modulator 786 is a coarse amplitude quantization of the input signal at a rate $f_s$. An input of the decimation filter 788 receives the output of the modulator 786 and reduces the sample rate while increasing the number of bits per sample.

Figure 7B:
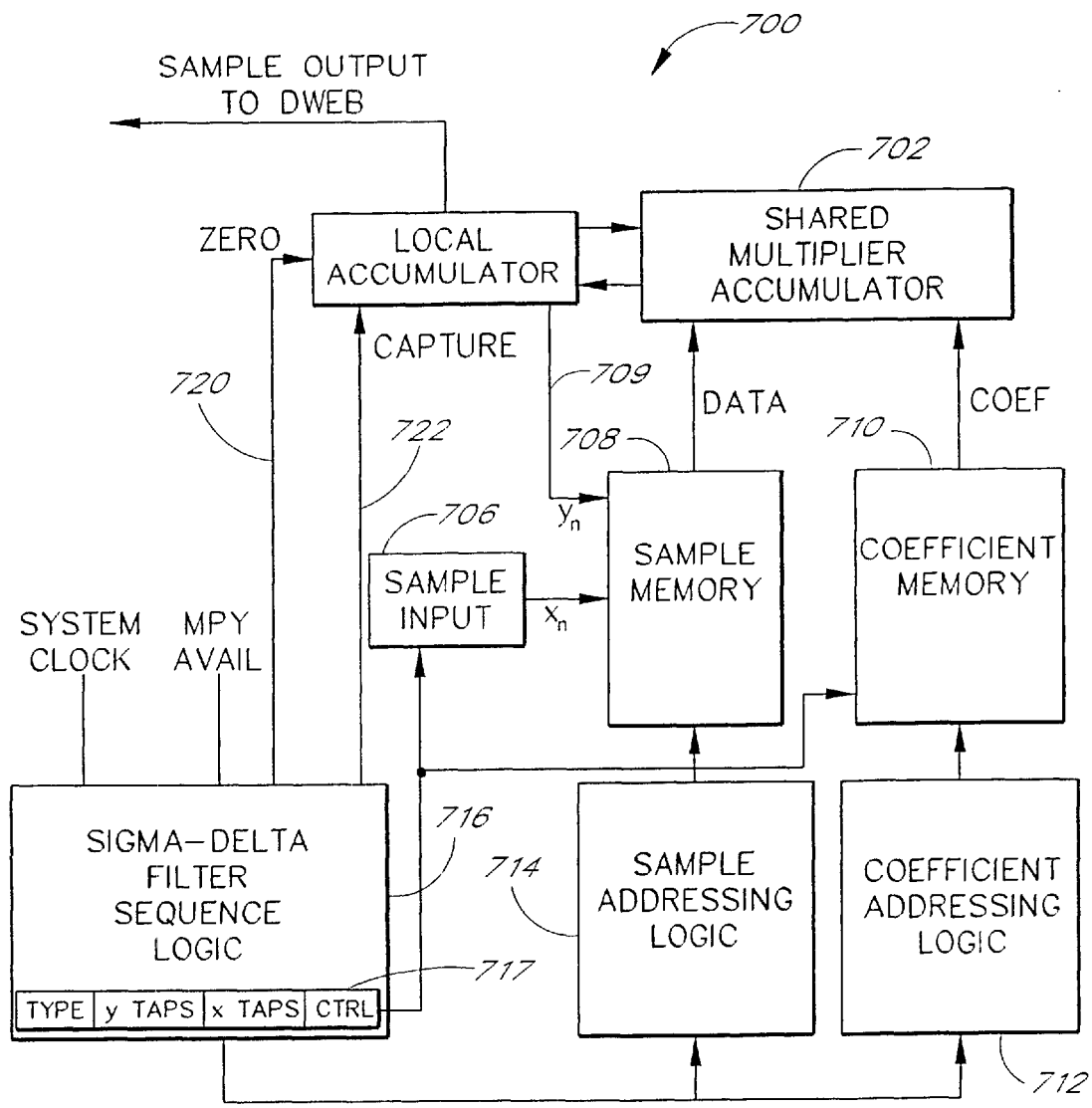
FIG. 7B is a block diagram of a fixed function control circuit which implements a sigma-delta analog to digital converter.
Figure 7C:
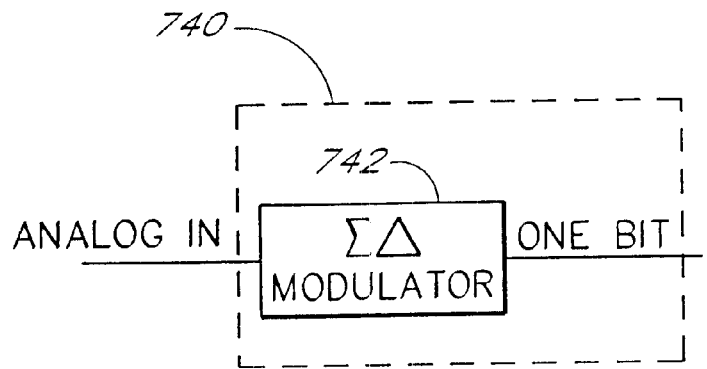
FIG. 7C illustrates a sample input block for an analog-to-digital converter fixed function circuit according to FIG. 7B, where the sample input block comprises a sigma-delta modulator.
Figure 7D:
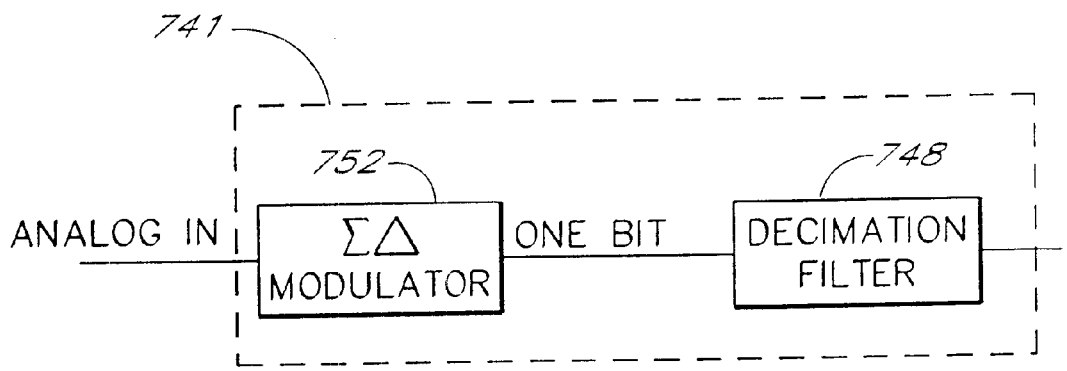
FIG. 7D illustrates a sample input block for an analog-to-digital converter fixed function circuit according to FIG. 7B, where the sample input block comprises a sigma-delta modulator and a dedicated high speed decimation filter.

FIG. 7B is a block diagram of an integrated fixed function circuit which includes a sigma-delta analog to digital converter as shown in either FIGS. 7C or 7D. The circuit 700 is assumed to be connected to a DSP having a MAC 702 which is shared by the DSP and the circuit 700. For example, the circuit 700 can be connected to the DSP of FIG. 4. The circuit 700 has a sequence logic block 716 which receives a system clock signal and a MAC available signal from the DSP. The sequence logic block 716 provides control outputs to a sample address logic block 714 and a coefficient address logic block 712. The sample address logic block 714 provides an address output to a sample memory 708. The sample memory 708 provides a data output to the shared MAC 702. The sample memory 708 receives data inputs from a sample input block. The sample input block can be any circuit which provides a stream of data samples. For example, the sample input block can be coupled to the DRDB 404 so that the input samples to the fixed function circuit are loaded under program control. In an alternative embodiment, the sample input block can be coupled to an external input bus. In yet another embodiment, the sample input block 706 can be an analog-to-digital converter. The sample memory 708 may also receive data from a local accumulator 704. The coefficient address logic block 712 provides an address output to a coefficient memory 710. The coefficient memory 710 provides a data output to the shared MAC 702. The coefficient memory 710 provides filter coefficients (such as the values $a_k$ in Equation 1).

The circuit 700 also provides a local accumulator 704. The sequence logic 718 provides a zero line 720 to clear the contents of the local accumulator 704 and a capture line 722 to load the local accumulator 704. When the capture line 722 is asserted, the local accumulator 704 captures the accumulator value in the shared MAC 702.

The filter sequence logic block 716 contains the necessary control logic needed to implement the desired fixed function. The sequence logic block 716 controls the sample addressing logic block 714 and the coefficient addressing logic block 712. In response to addresses generated by the sample addressing logic block 714, the sample memory 708 provides sample data to the shared MAC 702. In response to addresses generated by the coefficient addressing logic block 712, the coefficient memory 710 provides filter coefficients to the shared MAC 702. An optional data path 709 provides data from the local accumulator 704 to the sample memory 708 and thereby enables the implementation of IIR algorithms. A control register 717 in the logic block 716 may be provided to configure the operation of the circuit 700. In a preferred embodiment, the control register 717 has a type field, an x-taps field, a y-taps field, and a modulator control field. The type field specifies the type of digital filtering performed by the circuit 700, the x-taps field specifies the number of filter taps for $x_n$, the y-taps field specifies the number of filter taps for $y_n$. The modulator control field contains bits to control the operation of the sigma-delta modulator, and optionally the high speed decimation filter 748. For example, the control field of the register 717 may contain a subfield to specify the oversampling rate $f_s$ and/or a sub-field to control a filter transfer function for the high speed decimation filter 748.

FIG. 7C illustrates one embodiment of the sample input block 706 comprising a sigma-delta modulator 742. The sigma-delta modulator 742 is a one bit modulator that receives an analog input and produces a one bit digital output stream. FIG. 7D illustrates another embodiment of the sample input block 706 comprising a sigma-delta modulator 752 which provides a one bit digital output stream to a dedicated fast decimation filter 748. An output of the decimation filter 748 is provided as an input to the sample memory 708.

In the embodiment of FIG. 7C, the shared accumulator is used to provide the decimation filter function block 788. This has the advantage of minimizing additional circuitry. However, the approach may limit the bandwidth capability of the ADC because of the high frequency processing demands of the filter 788. In the embodiment of FIG. 7D, bandwidth of the ADC is improved by using a dedicated high frequency decimation filter 748. The filter 748 preprocesses the modulator output and thus reduces the processing demands on the fixed function circuit.

Whether processed by a dedicated filter block 748 or by the fixed function circuit using the shared MAC 702, the resulting decimated signal is then post filtered by the fixed function circuit 700. The desired transfer function for the post filtering depends on the type of sigma-delta converter used in the modulator block 742.

In an alternative embodiment, the output of the modulator 742 may be provided to an input register or a memory location of the DSP. In this case, software operating on the DSP can provide the decimation and filtering to create a final digital representation of the input signal.

Secondary Pipeline

The fixed function embodiment shown in FIG. 4 uses the T register 409, the P register 411 and accumulator 434 from the DSP. Thus, even though the embodiment of FIG. 4 only uses the MAC during periods when it would otherwise be idle, the embodiment of FIG. 4 will potentially leave the T register 409, P register 411, and accumulator 434 in a corrupted state. The DSP control logic could save these registers before allowing the fixed function circuit 450 to use the MAC and then restore the registers afterward, but this would take extra cycles.

Figure 8A:
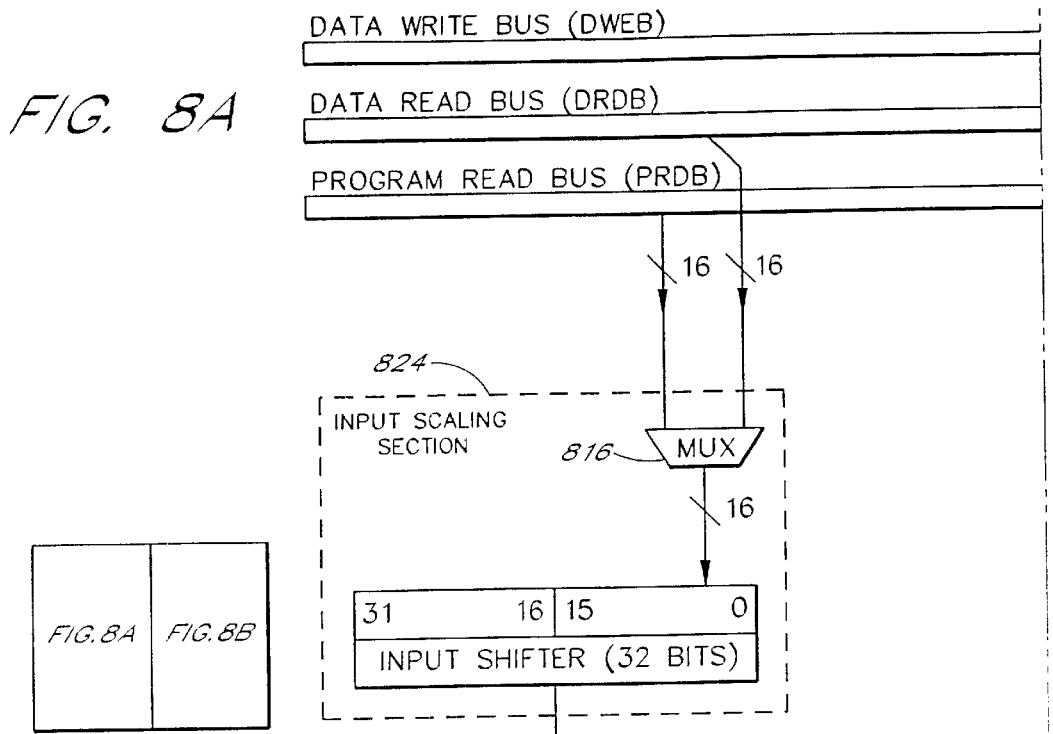
FIGS. 8A and 8B, is a block diagram of a DSP having an integrated fixed function control circuit which shares the multiplier-accumulator resources of the DSP and which provides an independent pipeline.
Figure 8:
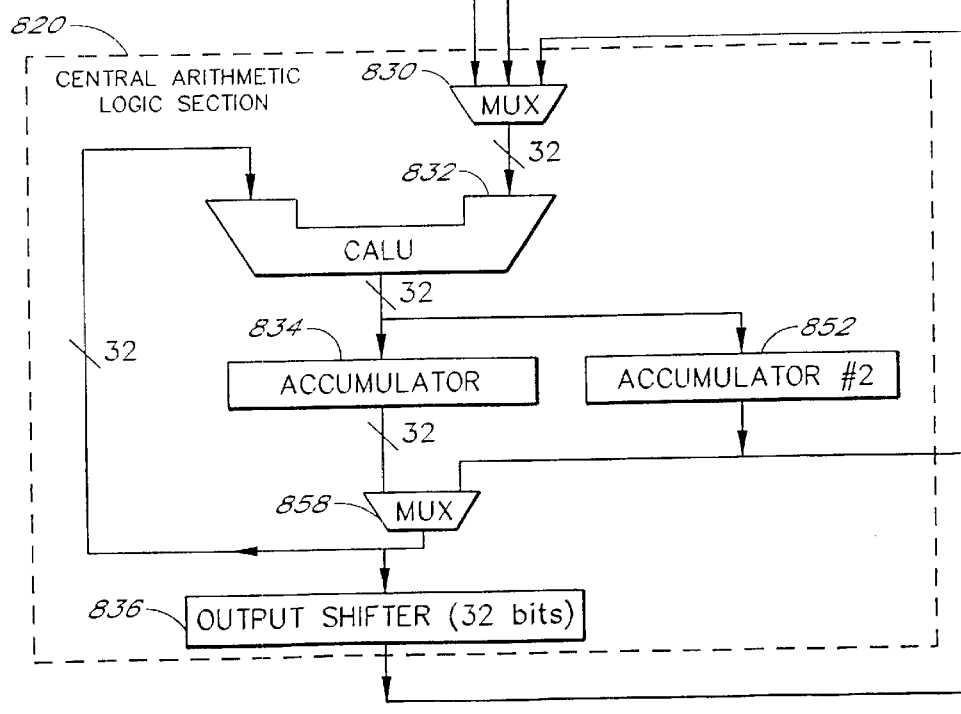
FIG. 8, comprising
Figure 8B:
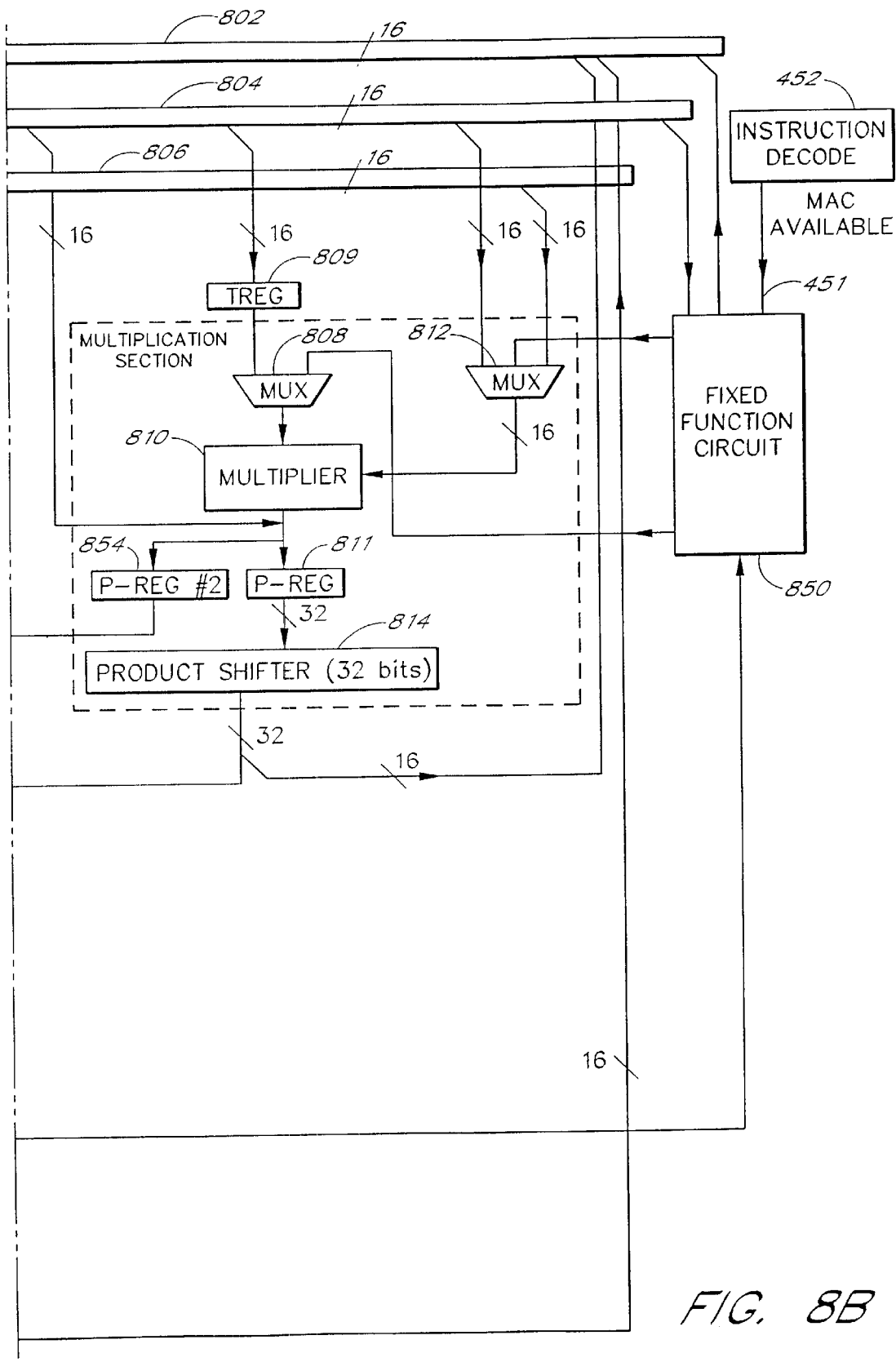

The circuit of FIG. 8 shows an alternate embodiment which provides for a second P register 854 and a second accumulator 852 to be used by the fixed function circuit and thereby avoid corrupting the T register 409, P register 411 and accumulator 434. FIG. 8 shows an input scaling section 824, a multiplication section 822, and a central arithmetic logic section 820. The multiplication section 822 includes a multiplier 810. A first input of the multiplier 810 is provided by a multiplexer 808. A first input of the multiplexer is provided by an output of a T register 809. An input to the T register 809 is provided by a data read bus (DRDB) 804. A second input of the multiplexer 808 is provided by the circuit 850. A second input of the multiplier 810 is provided by a multiplexer 812. A first input of the multiplexer 812 is provided by the DRDB 804, a second input of the multiplexer 812 is provided by a program read bus (PRDB) 806, and a third input of the multiplexer 812 is provided by a the circuit 850. The multiplier 810 has a single output which is provided to a P (product) register 809 and the secondary P register 854. The output of the secondary P register 854 is fed to a third input of a multiplexer 830. The output of the P register 811 is fed to a product shifter 814. An output of the product shifter 814 is provide to a data write buss (DWEB) 802. The input scaling unit 824 includes an input multiplexer 816. A first input of the input multiplexer 816 is provided by the PRDB 806. A second input of the input multiplexer 816 is provided by the DRDB 804. The input multiplexer 816 has a single output which is provided as an input to an input shifter 818.

The central arithmetic logic section 820 includes an arithmetic logic unit (ALU) 832, the multiplexer 830, an accumulator 834 and an output shifter 836. A first input of the multiplexer 830 is provided by the input shifter 818. A second input to the multiplexer 830 is provided by the product shifter 814. The multiplexer 830 has a single output which is provided to a first input of the ALU 832. An output of the ALU 832 is provided to an input of the accumulator 834 and an input of the secondary accumulator 852. A second input of the ALU 832 is provided by an output of a multiplexer 858. The output of the accumulator 834 is provided to a first input of the multiplexer 858. A second input of the multiplexer 858 is provided by the output of the accumulator 852. An output of the multiplexer 858 is provided to the output shifter 836. An output of the output shifter 836 is provided to the data write bus (DWEB) 802.

The output of the secondary accumulator 852 is also provided to an input of the circuit 850. An input of the circuit 850 is provided by the DRDB 304. An output of the circuit 850 is provided to the DWEB 802. A MAC available input to the circuit 850 is provided by a MAC available output of an instruction decode circuit 852.

In the circuit of FIG. 8, the accumulator 834 and the P register 811 are used by the DSP during normal program operation. The secondary accumulator 852 and the secondary P register 854 are used when the DSP asserts the MAC available line and gives the MAC to the fixed function circuit. In this manner, the operation of the programmable DSP and the operation of the fixed function circuit are transparent to one another, and no clock cycles are lost when transitioning from one mode to the other.

VLIW Embodiments

Figure 9:
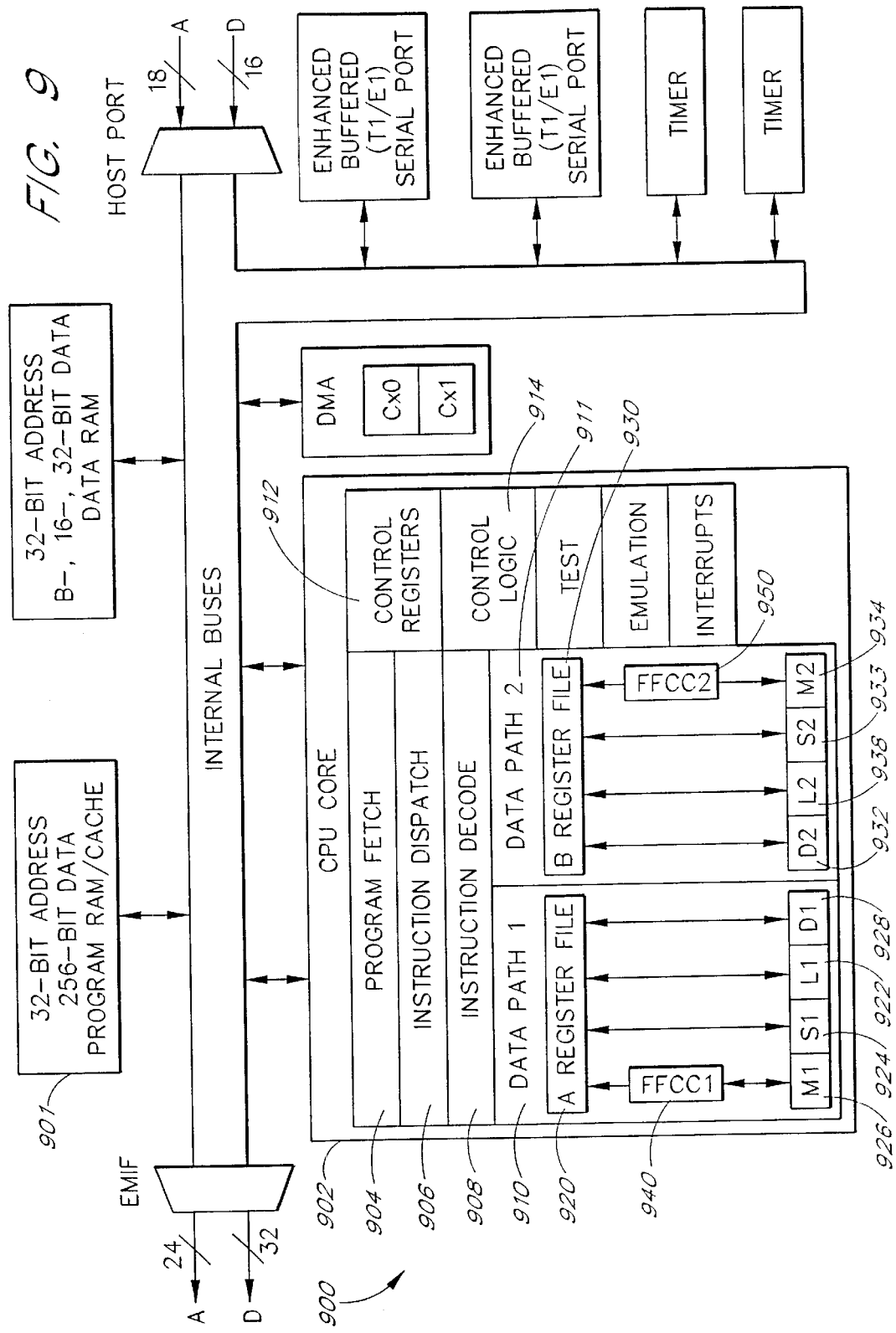
FIG. 9 is a block diagram of a Very Long Instruction Word (VLIW) DSP that incorporates one or more fixed function control circuits.

FIG. 9 is a block diagram of a Very Long Instruction Word (VLIW) DSP 900 which is provided with two fixed function circuits. The VLIW DSP 900 includes a program memory 901 and a central processor unit (CPU) core 902. A pipeline in the CPU core 902 has a program fetch block 904, an instruction dispatch block 906, an instruction decode block 908, and two parallel data paths 910 and 911. The data path 910 has a register file 920, an L1 function block 922, an S1 function block 924, a MAC function block 926, and a D1 function block 928. The function blocks 922, 924, 926, and 928 operate primarily on data in the registers 920. The data path 911 is similar to the data path 910 and has a register file 930, an L2 function block 938, an S2 function block 933, a MAC function block 934, and a D2 function block 932. The function blocks 932, 933, and 938 operate on data in the registers 930.

Program instructions are fetched from the program memory 901 by the fetch block 904. The fetched instructions are then passed to the dispatch block 906 for dispatch. The dispatched instructions are then passed to the decode block 908 which controls the operation of the register files 920, 930 and the function blocks. Operation of the pipeline is controlled by a set of control registers 912 and control logic 914.

FIG. 9 also shows two fixed function control circuits which provide for sharing of the MAC 926 and the MAC 934. A fixed function control circuit 940 provides for sharing of the MAC 926, and a fixed function control circuit 950 provides for sharing of the MAC 934. As shown in the FIG. 9, data between the MAC 926 and the register file 920 passes through the fixed function circuit 940. Thus it is the fixed function circuit 940 that ultimately controls the data supplied to the MAC 926. The control logic 914 provides a MAC available signal to the control circuit 940 to inform the control circuit 940 of those periods when the MAC 926 is idle. Likewise, data between the MAC 934 and the register file 930 passes through the control circuit 950. The control logic 914 also provides a MAC available signal to the control circuit 950 to inform the control circuit 950 of those periods when the MAC 934 is idle.

Other Embodiments

Although specific embodiments of the invention have been described and illustrated above, those of skill in the art will appreciate that various changes and modifications can be made to the present invention without departing from the spirit and scope of the invention. Accordingly, the scope of the present invention should not be limited to the foregoing discussion but should be defined by the appended claims.

What is claimed is:

1. A digital signal processor, comprising:
   a multiplier;
   an accumulator;
   a program memory adapted to store a software program to control the operation of said multiplier and said accumulator; and
   a fixed function control circuit configured to use said multiplier during time periods when said multiplier would otherwise be idle, at least a portion of said time periods occurring at irregular intervals, said fixed function control circuit configured to use said multiplier to implement a digital signal processing algorithm irrespective of the execution of said software program.

2. The digital signal processor of claim 1, wherein said fixed function control circuit is further configured to use said accumulator during time periods when said accumulator would otherwise be idle, said fixed function control circuit configured to use said accumulator to implement a digital signal processing algorithm.

3. The digital signal processor of claim 2, wherein said fixed function control circuit is configured to implement a digital filter algorithm.

4. The digital signal processor of claim 3, wherein said digital filter algorithm is a finite impulse response filter.

5. The digital signal processor of claim 3, wherein said digital filter algorithm is an infinite impulse response filter.

6. The digital signal processor of claim 3, said fixed function control circuit further comprising:
   a sample memory to provide sample data to a data input of said multiplier; and
   a coefficient memory to provide filter coefficients to a coefficient input of said multiplier.

7. The digital signal processor of claim 3, said fixed function control circuit further comprising a control register, said control register comprising one or more bits which specify a type of digital filter to be implemented by said fixed function control circuit.

8. The digital signal processor of claim 7, said control register further comprising one or more bits which specify a number of taps for said digital filter.

9. The digital signal processor of claim 3, said fixed function control circuit further comprising:
   a sigma-delta modulator;
   a sample memory configured to receive sample data from said modulator and configured to provide said sample data to a data input of said multiplier; and
   a coefficient memory providing filter coefficients to a coefficient input of said multiplier.

10. The digital signal processor of claim 9, said fixed function control circuit further comprising a control register, said control register comprising one or more bits which specify a type of digital filter to be implemented by said fixed function control circuit.

11. The digital signal processor of claim 10, said control register further comprising one or more bits which specify a number of taps for said digital filter.

12. The digital signal processor of claim 10, said control register further comprising one or more bits which specify a number of x taps for said digital filter.

13. The digital signal processor of claim 10, said control register further comprising one or more bits which specify a number of y taps for said digital filter.

14. The digital signal processor of claim 10, said control register further comprising one or more bits which specify an oversample rate for said sigma-delta modulator.

15. The digital signal processor of claim 3, said fixed function control circuit further comprising:
   a sigma-delta modulator;
   a decimation filter configured to receive sample data from said modulator;
   a sample memory configured to receive sample data from said decimation filter and configured to provide said sample data to a data input of said multiplier; and
   a coefficient memory providing filter coefficients to a coefficient input of said multiplier.

16. The digital signal processor of claim 15, said fixed function control circuit further comprising a control register, said control register comprising:
   one or more bits which specify an oversample rate for said sigma-delta modulator type of digital filter to be implemented by said fixed function control circuit; and
   one or more bits which specify a decimation rate for said decimation filter.

17. A digital signal processor, comprising:
   a multiplier;
   an accumulator;
   a program memory configured to store a software program to control the operation of said multiplier and said accumulator; and
   a control means for using said multiplier during time periods when said multiplier is not used by said software program, the occurrence of said time periods being non-deterministic;

wherein said control means is configured to operate independent of said software program.

18. The digital signal processor of claim 17, further comprising a register means for configuring how said multiplier is used by said control means.

19. The digital signal processor of claim 18, further comprising a priority allocation means for allocating use of said multiplier to said control means.

20. The digital signal processor of claim 18, further comprising a cycle steal means for allocating use of said multiplier to said control means.

21. A method for using a multiply-accumulator in a digital signal processor comprising the acts of:

using a multiplier to perform computations specified by a program stored in a program memory during a first plurality of clock cycles;

identifying a second plurality of clock cycles when said multiplier is not used by said program to perform computations; and using said multiplier to perform computations specified by a programmable circuit during said second plurality of clock cycles, wherein the performance of said computations is controlled independently of the execution of said program.

22. The method of claim 21, further comprising the acts of:

using an adder to perform computations during a third plurality of clock cycles; and using said adder to perform computations specified by said fixed function control circuit during a fourth plurality of clock cycles.

23. The method of claim 21, wherein said fixed function control circuit implements a digital filter.

24. The method of claim 23, wherein said digital filter comprises an infinite impulse response filter.

25. The method of claim 23, wherein said digital filter comprises a finite impulse response filter.

26. The method of claim 21, further comprising the act of using a control register to specify a type of digital filter to be implemented by said fixed function control circuit.

27. In a digital signal processor comprising a multiply-accumulator, an instruction set adapted for performing operations using said multiply-accumulator, and a programmable fixed function circuit, a method for implementing a digital filter in said digital signal processor comprising the acts of:

identifying at least one idle period during which said multiply-accumulator will be idle; and using said multiply-accumulator independent of the execution of said instruction set to perform at least one calculation for said digital filter during said idle period.

28. The method of claim 27, wherein the act of identifying said at least one idle period comprises:

reading at least a portion of the contents of at least one data register, said contents comprising at least one instruction;

analyzing said at least one portion to determine if said multiply-accumulator is required to execute said at least one instruction; and generating a signal indicative of the availability of said multiply-accumulator if said multiply-accumulator is not required to execute said at least one instruction.

29. The method of claim 28, further comprising:

providing said signal to a fixed function circuit;

taking control of the multiply-accumulator using said fixed function circuit; and performing said at least one calculation for said digital filter using said fixed function circuit and said multiply-accumulator.

30. The method of claim 28, wherein the act of reading comprises the act of reading at least a portion of the contents of the instruction decode register.

31. In a digital signal processor comprising an instruction set, a multiply-accumulator, and a function circuit controlled at least in part by a programmable device, a method for performing calculations on digital data processed by said digital signal processor comprising the acts of:

controlling said multiply accumulator using said instruction set during a first plurality of time periods;

identifying a second plurality of time periods during which said multiply-accumulator will be idle; and controlling said function circuit using said programmable device to perform at least a portion of said calculations using said multiply-accumulator during at least a first portion of said second time periods.

32. A digital signal processor, comprising:

a multiplier;

an accumulator;

a computer program adapted to control the operation of said multiplier and said accumulator during a first plurality of time periods;

a program memory adapted to store said computer program;

a programmable control circuit configured to use said multiplier to implement an algorithm for processing digital data based on the contents of at least one data register, said processing occurring during a second plurality of time periods when said multiplier would otherwise be idle.

* * * * *

UNITED STATES PATENT AND TRADEMARK OFFICE
CERTIFICATE OF CORRECTION

PATENT NO.    : 6,367,003 B1
DATED         : April 2, 2002
INVENTOR(S)   : Henry A. Davis It is certified that error appears in the above-identified patent and that said Letters Patent is hereby corrected as shown below:

Column 13,
Lines 7 and 8, "function blocks 932, 933, and 938 operate on data in the registers 930." should read -- function blocks 932, 933, 934, and 938 operate on data in the registers 930. --

Column 16,
Lines 34-37, "controlling said function using said programmable device to perform at least a portion of said calculations using said multiply-accumulator during at least a first portion of said second time periods." should read
-- controlling said function circuit using said programmable device independent of said instruction set to perform at least a portion of said calculations using said multiply-accumulator during at least a first portion of said second time periods. --

Signed and Sealed this

Nineteenth Day of August, 2003

JAMES E. ROGAN
*Director of the United States Patent and Trademark Office*